United States Patent
Roh et al.

(10) Patent No.: US 8,630,374 B2
(45) Date of Patent: Jan. 14, 2014

(54) PACKET DETECTION AND COARSE SYMBOL TIMING FOR ROTATED DIFFERENTIAL M-ARY PSK MODULATED PREAMBLE SIGNAL

(75) Inventors: June Chul Roh, Allen, TX (US); Anuj Batra, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 612 days.

(21) Appl. No.: 12/881,924

(22) Filed: Sep. 14, 2010

(65) Prior Publication Data

US 2011/0069707 A1    Mar. 24, 2011

Related U.S. Application Data

(60) Provisional application No. 61/244,261, filed on Sep. 21, 2009.

(51) Int. Cl.
    *H03D 3/22*    (2006.01)
(52) U.S. Cl.
    USPC .......................... 375/329; 370/392
(58) Field of Classification Search
    USPC .................. 370/392; 375/329, 322, 316
    See application file for complete search history.

(56) References Cited

U.S. PATENT DOCUMENTS

| | | | |
|---|---|---|---|
| 2006/0078040 A1* | 4/2006 | Sung et al. | 375/140 |
| 2007/0032966 A1* | 2/2007 | Song | 702/35 |
| 2007/0058714 A1* | 3/2007 | Noda | 375/240.03 |
| 2007/0183520 A1* | 8/2007 | Kim et al. | 375/260 |
| 2009/0028220 A1* | 1/2009 | Roh et al. | 375/136 |
| 2009/0245332 A1* | 10/2009 | Ishii et al. | 375/150 |

OTHER PUBLICATIONS

"Draft Standard for Body Area Network," IEEE P802.15.6/D01, May 2010 (218 pp. total; discussed on p. 1 of the specification).

* cited by examiner

*Primary Examiner* — Chieh M Fan
*Assistant Examiner* — Brian J Stevens
(74) *Attorney, Agent, or Firm* — Steven A. Shaw; Wade James Brady, III; Frederick J. Telecky, Jr.

(57) ABSTRACT

A packet detection and coarse symbol timing recovery system for preamble signal modulated with rotated differential M-ary phase shift key (PSK) modulation includes a differential detection unit, to provide a symbol signal responsive to a received signal. A preamble sequence correlator performs a preamble sequence correlation on the symbol signal to produce a correlator signal. A metric calculation unit performs a metric calculation on the correlator signal to produce a metric. A packet detection unit determines that a packet is detected and produces a sample index. A coarse symbol timing unit finds a peak of the calculated metric signal outputs a sample index for the peak as coarse symbol timing information. The sample indexes are used in processing a physical layer convergence procedure (PLCP) header and physical layer service data unit (PSDU) block.

19 Claims, 8 Drawing Sheets

PACKET DETECTION AND COARSE SYMBOL TIMING FOR ROTATED DIFFERENTIAL M-ARY PSK MODULATED PREAMBLE SIGNAL

CROSS-REFERENCE TO RELATED APPLICATION

This application claims the benefit of the following provisional application: 61/244,261, filed Sep. 21, 2009, which is expressly incorporated herein by reference.

TECHNICAL FIELD

The technical field relates in general to medical systems and packet based communication systems, and more specifically to packet detection and coarse symbol timing for a signal modulated with rotated differential M-ary phase shift keying (PSK) modulation.

BACKGROUND

Packet detection and coarse symbol timing recovery can be performed in most packet-based communication systems for example, BAN (body area network) that is based on IEEE 802.15.6.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
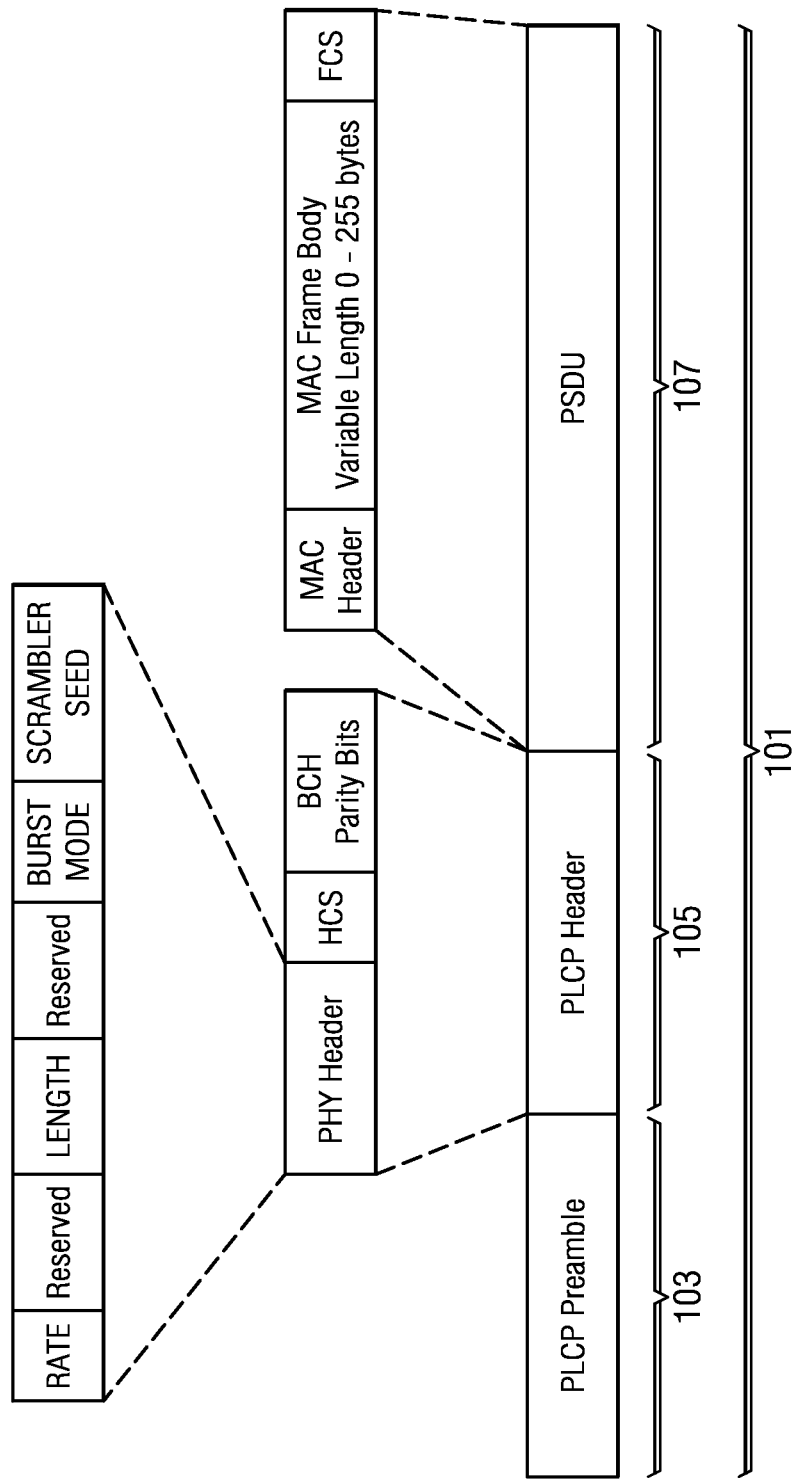
FIG. 1 is a simplified illustration of the format for physical layer protocol data unit (PPDU) of IEEE 802.15.6 draft standard for BAN.

In overview, the present disclosure concerns packet communication networks for supporting devices or units, often referred to as communication systems or communication units, which can be equipped for wireless communications. Some of these packet communication networks are short range wireless networks, some of which are referred to as a wireless body area network (WBAN) or a body area network (BAN), and can include mobile, wearable and/or implantable devices that can wirelessly transmit data such as from a body being monitored over a short range, from whence the data can be forwarded, for example used in a medical body monitoring application. Such communication systems may process communication packets which comprise a physical layer convergence procedure (PLCP) preamble, a PLCP header, and a physical layer service data unit (PSDU). More particularly, various inventive concepts and principles are embodied in communication systems, devices, and methods therein for detecting packets in a wireless packet communication network.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in integrated circuits (ICs) and/or software, such as a digital signal processor and software therefore, and/or application specific ICs. The designation "unit" is used herein to refer to a block which could be implemented as a circuit or within software existing or executing on a processor. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

As further discussed herein below, various inventive principles and combinations thereof are advantageously employed to provide architectures that allow improved packet detection and coarse symbol timing estimation.

Further in accordance with exemplary embodiments, there is provided packet detection and coarse symbol timing methods, systems, and devices for packet communications that employ preamble modulated with rotated differential M-ary PSK modulation.

Embodiments can provide packet detection and coarse symbol timing methods for packet-based systems where preamble signal is modulated with differential phase shift keying (PSK). One of such systems (with rotated differential M-ary PSK modulated preamble) is wireless body area network (BAN) based on IEEE P802.15.6/D01, Draft Standard for Body Area Network, May 2010.

Referring now to FIG. 1, a simplified illustration of the format for physical layer protocol data unit (PPDU) of IEEE 802.15.6 draft standard for BAN will be discussed and described. FIG. 1 shows the format for a PPDU 101 of the IEEE draft standard for BAN which is composed of three main components: the PLCP preamble 103, the PLCP header 105 and the PSDU 107. The components are listed in the order of transmission. The PLCP preamble 103 is the first component of the PPDU 101. The purpose of the preamble 103 is to aid the receiver in packet detection, timing synchronization and carrier-offset recovery.

In the IEEE draft standard for BAN, the PLCP preamble is 90 symbols long. The preamble has two portions: the first portion is the M-sequence (63 symbols), followed by extension sequence (27 symbols long). All the symbols in the PLCP preamble are modulated with rotated differential binary PSK. Embodiments discussed herein can be limited to the M sequence of the PLCP preamble 103 for packet detection and symbol timing, that is, the first portion of the preamble. However, any sequence is possible if the sequence is deterministic and known to the transmitter and the receiver. In a transceiver compliant with IEEE BAN, one can even use the part of M-sequence or just a non-zero subset of the M-sequence, or a longer sequence that includes part of, a non-zero subset of, or all of the M-sequence and the part or all of the extension sequence. The correlation length is selectable parameter, keeping in mind these considerations. Hence, other embodiments can be provided based on an understanding of this typical example.

The PLCP header 105 is the second main component of the PPDU 101. The purpose of this component is to convey the necessary information about the PHY parameters to aid in decoding of the PSDU 107 at the receiver. The PLCP header 105 can be further decomposed into a RATE field, a LENGTH field, a BURST MODE field, SCRAMBLER SEED field, a header check sequence (HCS), BCH parity bits, and reserved bits, and perhaps other fields, which will be well understood by reference to the IEEE draft standard for BAN. The BCH parity bits are added in order to improve the robustness of the PLCP header. The RATE field, LENGTH field, reserved bits, BURST MODE field and SCRAMBLER SEED field together form the PHY header, which is part of the PLCP header 105. The PLCP header 105 may be transmitted using the given header data rate in the operating frequency band, for example as defined in the IEEE standard for BAN.

The PSDU 107 is the last component of the PPDU 101. This component is formed by concatenating the MAC header with the MAC frame body and frame check sequence (FCS). The PSDU 107 is then scrambled and (optionally) encoded by a BCH code. The PSDU 107 shall be transmitted using one of the available data rates available in the operating frequency band.

The IEEE draft standard for BAN defines two unique preambles in order to mitigate false alarms due to networks operating on adjacent channels. Each preamble is constructed by concatenating a length-63 m-sequence and a length 27 sequence as specified in the IEEE Draft Standards. The two preamble sequences are defined in the IEEE Draft Standards, variations and evolutions thereof. The preambles will be transmitted at the symbol rate for the desired band of operation and will be encoded using $\pi/2$-DBPSK (DBPSK: differential binary phase sift keying).

Packet Detection Methods

Packet detection is one of the functionalities required by a receiver. To detect the packet, a receiver typically correlates the received signal with the known sequence (in the example herein, the preamble sequence).

The IEEE draft standard for BAN uses differential phase shift keying (PSK) modulation for the preamble signal. More particularly, the transmit signal is using rotated differential binary PSK modulation, and has a signal structure different from any other standard. At the receiver, to detect the packet, the receiver can exploit all of the signal structure of the preamble.

Illustrated embodiments include packet detection and coarse symbol timing methods with an assumption for illustration purposes that the packet detection block is operating with 4 times oversampling (with respect to symbol rate). But, the proposed methods can be easily applied to other oversampling rate (e.g., 8 times oversampling).

In the drawings, FIG. 2, FIG. 4, FIG. 5 and FIG. 7 illustrate four different architectures A, B, C and D, respectively. Architectures A (FIG. 2) and B (FIG. 4) are similar, using a parallel structure, in which the receiver has multiple correlators (further illustrated in FIG. 3). Architectures C (FIG. 5) and D (FIG. 7) use a serial architecture instead of the parallel architecture. Each of architecture C and architecture D has one correlator, but the correlation length is longer than that of architectures A and B so as to be functionally equal to the correlator of the parallel architectures. In the illustrated architectures, the header and PSDU processing block is the same.

Figure 7:
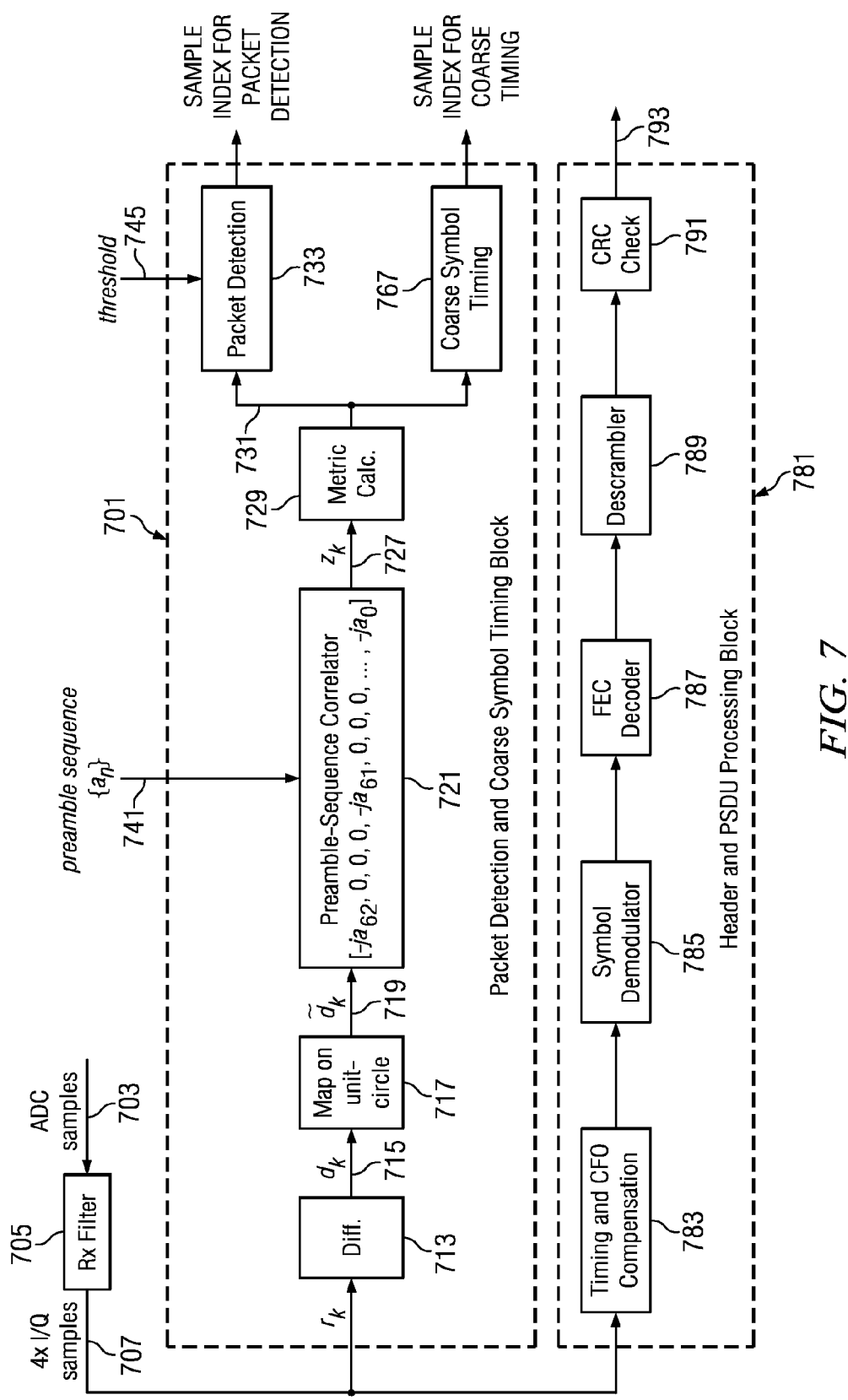
FIG. 7 is a functional block diagram of a fourth architecture for packet detection and coarse symbol timing (when N=63).

A difference between the parallel architectures A and B (FIG. 2 and FIG. 4), is the addition of a map on unit circle block in architecture B (FIG. 4) (discussed further below). Similarly, a difference between the serial architectures C and D (FIG. 5 and FIG. 7) is the map on unit circle block included in architecture D (FIG. 7).

Architecture A

Figure 2:
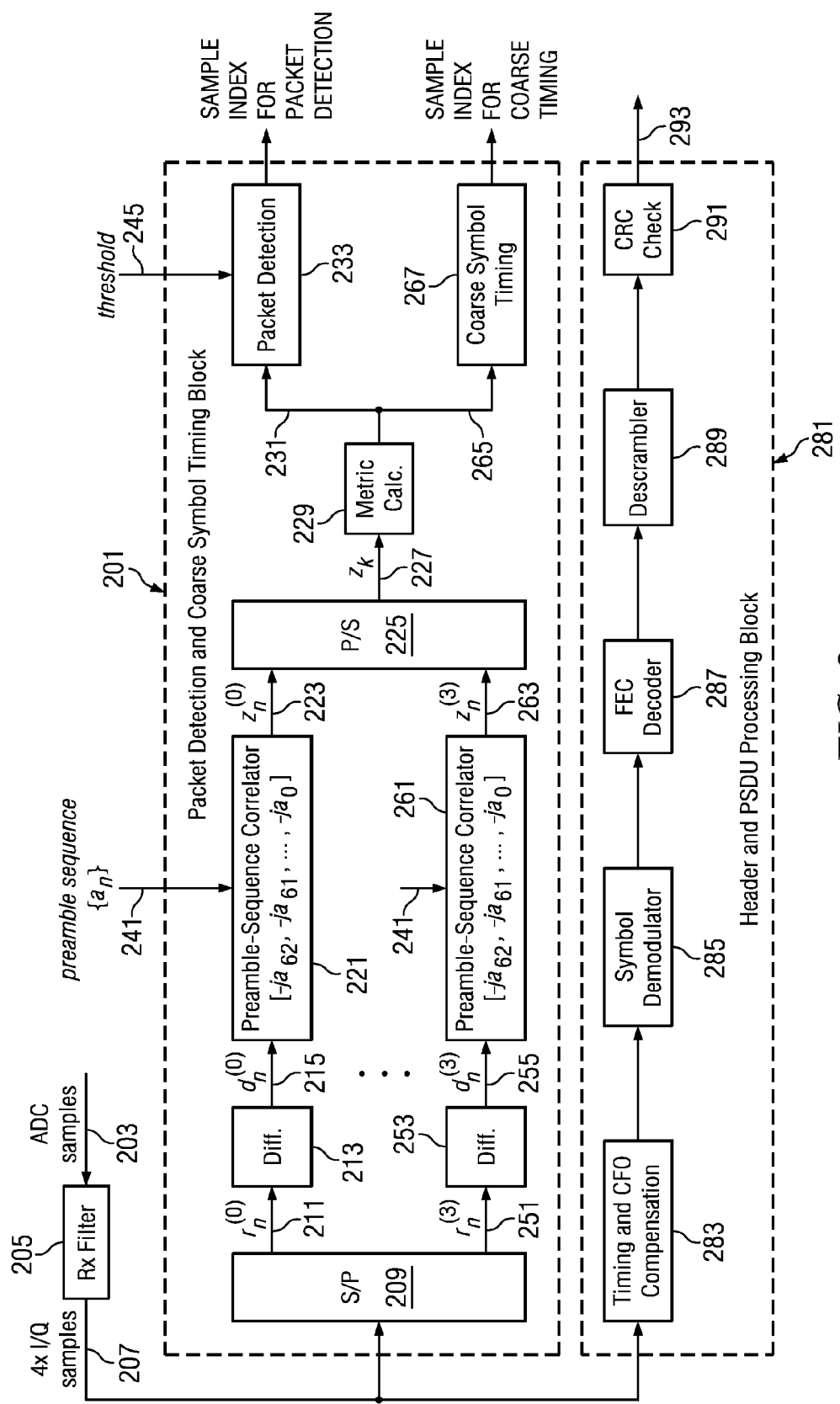
FIG. 2 is a functional block diagram illustrative of packet detection and coarse symbol timing (for correlation length N=63).
Figure 3:
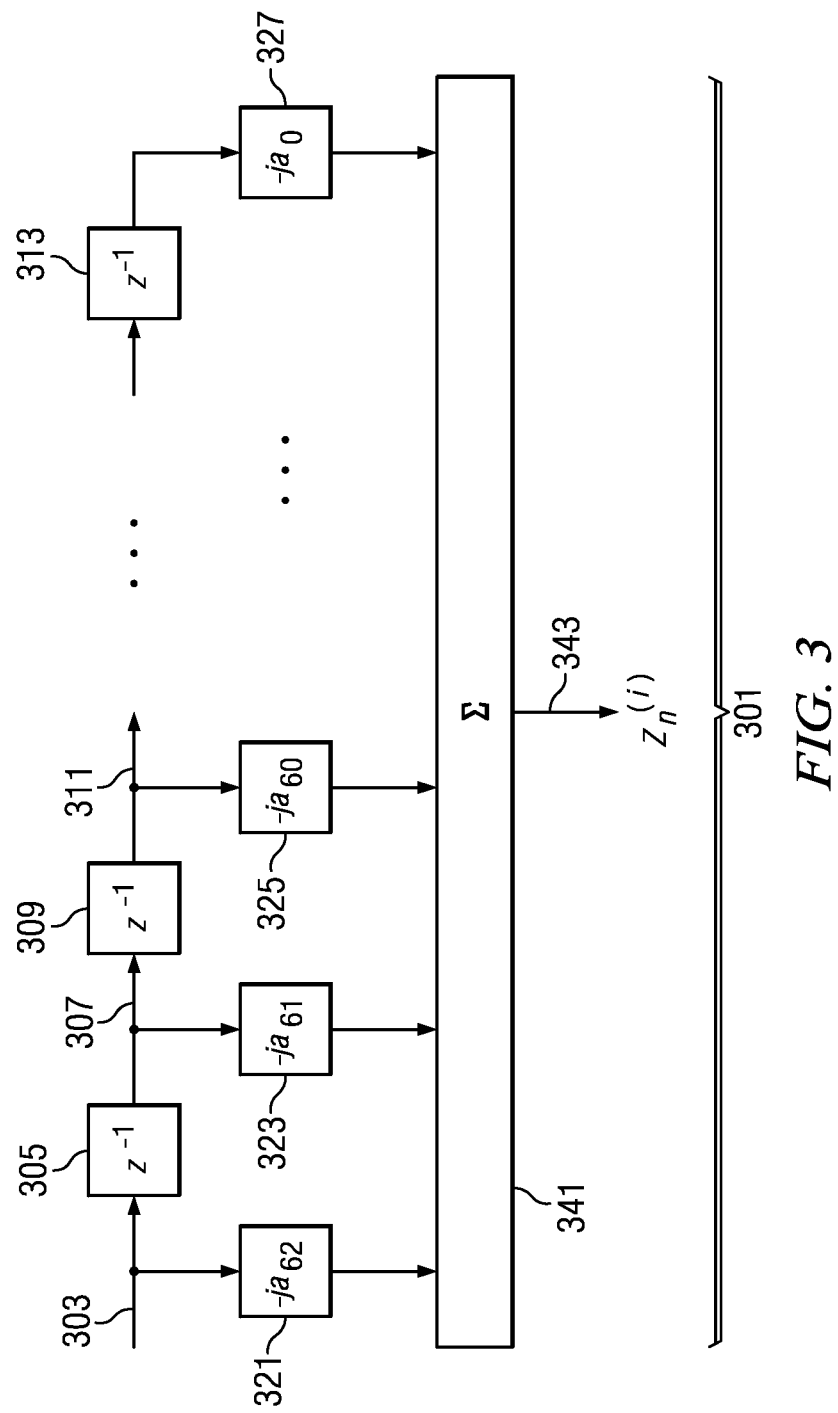
FIG. 3 is a functional block diagram of a preamble-sequence correlator of FIG. 2 (for N=63).

Referring now to FIG. 2, a functional block diagram illustrative of packet detection and coarse symbol timing (for correlation length N=63) will be discussed and described. In overview, in a packet detection and coarse symbol timing recovery system 201 for a preamble signal modulated with rotated differential M-ary PSK modulation, ADC samples 203 are received by a receive filter 205 to provide a filtered receiver signal sample 207. The system 201 then performs serial to parallel 209 on the filtered receiver signal sample 207 to provide a receiver sample 211, 251. Then the differential detector 213, 253 processes the received sample 211, 251 more specifically, taking a complex conjugate of the sample corresponding to the previous symbol and multiplying the conjugated one-symbol earlier sample with the current received sample, to calculate the soft-decision symbol 215, 255. The preamble sequence correlator 221, 261 takes the symbol 215, 255; then outputs the correlator output 223, 263. The multiple sets of differential detector 213, 253 and preamble-sequence correlator 221, 261 are in parallel. The number of branches equals the oversampling rate (four, in this example), one branch each for one sampling phase. The preamble-sequence correlator 221, 261 of FIG. 2 is illustrated in FIG. 3 and is discussed in more detail below.

The correlator output 223, 263 is input to a parallel to serial block 225 to provide a single correlator output 227. The single correlator output 227 is input to a metric calculation block 229 that calculates and outputs the metric 231. There are several different metrics which can be used, examples of which are discussed later. Then the system 201 performs a comparison of the metric 231 with the event threshold 245 in the packet detection block 233. Once the metric 231 exceeds the threshold, the packet is deemed to be acquired, sometimes also referred to as the packet being detected. The packet detection block 233 also outputs a sample index for packet detection.

Once the packet is detected, the metric 265 is input to a coarse symbol timing acquisition 267, which is the next step after the packet is acquired. The coarse symbol timing acquisition 267 performs peak detection for a pre-defined window length, such as for a three symbol length window, to try to find the peak in the metric within the window. This is referred to as "coarse symbol timing using the peak detection." The coarse symbol timing acquisition 267 outputs a sample index corresponding to the peak of the metric within the window.

The sample index for packet detection and the sample index for coarse symbol timing can be used (directly or after being further refined) in the other preamble processing block and in a PLCP header and PSDU processing block 281 to decode the packet. If the timing information obtained from the packet detector and coarse symbol timing block is not correct, no data can be decoded. The header and PSDU processing block 281 can receive the filtered receives samples 207, and can include timing and carrier frequency offset (CFO) compensation 283, symbol demodulator 285, forward error correction (FEC) decoder 287, descrambler 289, and CRC check 291 to output a PSDU 293 for further processing typically in MAC. The PSDU processing block 281 and components therein are well understood in the art, and hence further discussion thereof will be omitted.

The functional block diagram for one embodiment of packet detection and coarse symbol timing as illustrated in FIG. 2 will now be discussed in more detail, and the functionality of each block will be described. The preamble-sequence correlator 221, 261 of FIG. 2 is illustrated in FIG. 3.

The input signal to the packet detector is denoted as:

$$\ldots, r_{n-1}^{(0)}, r_{n-1}^{(1)}, r_{n-1}^{(2)}, r_{n-1}^{(3)}, r_n^{(0)}, r_n^{(1)}, r_n^{(2)}, r_n^{(3)}, \ldots$$

where the subscript index n changes at symbol rate, and the superscript index i represents four different sample phases within a symbol interval. This example is when the oversampling rate is 4. The ideas described here are readily applicable to other oversampling rates.

Soft-Decision Differential Detector

The differential detector 213 (represented by "Diff." in the illustrations) calculates symbols for each sampling phase as follows:

$$d_n^{(i)} = r_n^{(i)} r_{n-1}^{(i)*}, \text{ for } i=0,1,2,3. \quad (1)$$

where
$r_{n-1}^{(i)}$ is the sample that is one-symbol earlier than the current sample $r_n^{(i)}$,
$r_{n-1}^{(i)*}$ represents the complex-conjugate of $r_{n-1}^{(i)}$,
n is the symbol index, and
i represents the sampling phase within a symbol interval.

That is, the differential detector 213 processes the received samples, more specifically, taking a complex conjugate of the sample corresponding to the previous symbol and multiplying the conjugated one-symbol earlier sample with the current received sample, to calculate the (soft-decision) symbol. The symbol is output as a signal 215 from the differential detector 213 into the preamble sequence correlator 221.

Preamble-Sequence Correlator

Referring now to FIG. 3, a functional block diagram of a preamble-sequence correlator 221, 261 of FIG. 2 (for N=63) will be discussed and described. The correlator 301 can include delay elements 305, 309, 313 (represented by rectangles with the symbol $z^{-1}$), the filter coefficients 321, 323, 325, 327 (represented by rectangles with the symbol $-ja_{xx}$) of the correlator (coming from the preamble sequence), and a summer 341. Each filter coefficient 321, 323, 325, ..., 327, is multiplied by delayed sample (the current sample 303 and the output of the delay elements 305, 309 ... 313) that are summed by the summer 341 to provide the correlator output 343 (also referred to as the "correlate").

The preamble-sequence correlator 301 takes a correlation operation to the symbols (the output of the differential detector 213) with the (known) preamble sequence. FIG. 3 shows an implementation example for the correlator when the correlation length N=63. Any other correlation length is also possible. When correlation length is N (in symbols), the functional operation of preamble-sequence correlator 301 may be described as follows:

Filter input: $d_n^{(i)}$
Filter impulse response: $[-ja_{62}, -ja_{61}, \ldots, -ja_{62-N+1}]$
where $a_n \in \{1,-1\}$ is the bipolar preamble sequence ('1' for bit 0 and '−1' for bit 1), and N is the correlation length.
The correlator output $z_n^{(i)}$ for the i-th branch may be given mathematically by $$z_n^{(i)} = \sum_{l=0}^{N-1} (-ja_{62-l}) d_{n-l}^{(i)} \quad (2)$$

$$= \sum_{l=0}^{N-1} a_{62-l} [\text{Im}\{d_{n-l}^{(i)}\} - j\text{Re}\{d_{n-l}^{(i)}\}].$$

Note that since all the coefficients of the correlator have the form of ±j, the multiplication operations are simply exchange of inphase (I) and quadrature (Q) sample, and possible sign changes to I and Q samples using the binary preamble sequence $\{a_n\}$. For detail, see the second line of equation (2). $a_n \in \{-1,1\}$ is a bipolar preamble sequence ('1' for bit 0 and '−1' for bit 1).

The correlator output 343 is provided to the metric calculation block.

Accordingly, in a packet detection and coarse symbol timing recovery system for preamble signal modulated with rotated differential M-ary phase shift key (PSK) modulation for packet communications compliant with the IEEE standard for body area networks, there is provided a preamble sequence correlator, responsive to a symbol signal, that performs a preamble sequence correlation on a symbol signal to produce a correlator signal, the preamble sequence correlator including delay elements, filter coefficients, and a summer, each of the filter coefficients being multiplied by a delayed sample output of the delay elements that are summed by the summer to provide the correlator signal for further use in preamble processing. Further according to an embodiment, in the packet detection and coarse symbol timing recovery system, the preamble sequence correlation multiplication of the filter coefficients by the delayed sample output is an exchange of inphase and quadrature samples of a preamble sequence in a received signal, and changing of sign to the inphase and quadrature samples using the binary preamble sequence, which are summed to produce the correlator signal, the preamble sequence being binary and bipolar.

Parallel-to-Serial (P/S)

Referring back to FIG. 2, the parallel to serial ("P/S") block 225 receives the correlator output 343 from all of the parallel preamble sequence correlators 221, 261 and then provides one correlator output 227. The P/S output is denoted as $z_k = z_n^{(i)}$, where $k = R_{os,PD} n + i$ ($R_{os,PD}$ is the oversampling rate for packet detection, $R_{os,PD} = 4$ in our example).

Packet Detection Metric Calculation

Still referring to FIG. 2, the metric calculation block 229 inputs the one correlator output 227 and performs the metric calculation on the correlator output 227, to generate the metric 231 (sometimes referred to as the "packet detection metric"). For example, the metric calculation block 229 can take the magnitude of the correlator output 227 and normalize by some factor to produce the packet detection metric 231. Four different metric calculations are discussed below.

One packet detection metric may be a magnitude of the preamble-sequence correlator output:

$$M_k = |z_k|. \tag{3}$$

Another packet detection metric may be a power (squared magnitude) of the preamble-sequence correlator output:

$$M_k = |z_k|^2. \tag{4}$$

Another metric can be $$M_k = \frac{|z_k|}{\text{average\_off-peak\_level}}. \tag{5}$$

where 'average_off-peak_level' is an estimation of correlation output profile (in magnitude) for off-the-peak samples (correlator output samples excluding some samples around the correlation peak). The metric calculation block 229 can exclude several large correlation samples, or exclude samples that are larger than a certain threshold in calculating 'average_off-peak_level'.

Another metric may be:

$$M_k = \frac{|z_k|^2}{\text{average\_off-peak\_level}}. \tag{6}$$

where 'average_off-peak_level' is an estimation of correlation output profile (in power) for off-the-peak samples.

Packet Detection

Reference is made back to FIG. 2. The metric 231 can be compared with a threshold 245 in the packet detection block 233. Packet detection can be declared when $$M_k \geq \gamma_{PD}. \tag{7}$$

where $\gamma_{PD}$ is a threshold for packet detection. The corresponding symbol index for packet detection is denoted as $k_{PD}$.

The packet detection threshold 245 can be predetermined to meet target performance, for example, performance in terms of false alarm rate and miss detect rate. A set of thresholds can be predetermined off-line, and one threshold from the set may be selected and used based on various system parameters such as operating frequency band, receiver mode, SNR estimation, interference estimation, and the like.

In the packet detection block 233 of this embodiment, there can be a branch corresponding to each of the sampling phases, that is, there can be four branches. Each branch operates at symbol rate and processes one of the four sampling phases.

Coarse Symbol Timing

Once packet detection is declared, the coarse symbol timing block 267 can input the metric 267, and can perform coarse symbol timing 267 to search for the peak of metric $M_k$ over a given length of time, for example, $L_{CT}$ symbol length (e.g., $L_{CT}=3$), around or from the time index $k_{PD}$ (that is, the sample index for packet detection) to find the peak. Then the coarse symbol timing block 267 can provide the sample index for the peak as coarse symbol timing (also referred to herein as "coarse symbol timing information") as follows:

$$k_{CT} = \arg\max_{k \in [k_{PD}, k_{PD}+R_{os,PD}L_{CT}-1]} M_k. \tag{8}$$

where [a, b] is the set of sample indices that are greater than or equal to a and less than or equal to b.

Accordingly, there is provided a packet detection and coarse symbol timing system or circuit which includes: a serial-to-parallel unit, responsive to a received signal, to branch the received signal into plural parallel received signals each operating at a same symbol rate and one of plural different sampling phases; a differential detection unit, responsive to the plural parallel received signals, to determine and provide a symbol signal, wherein the symbol signal is determined responsive to the plural parallel received signals; a preamble sequence correlator, responsive to the symbol signal, to perform a preamble sequence correlation on the symbol signal to produce a parallel correlator signal, the differential detection unit and the preamble sequence correlator operating in parallel on different branches of the branched received signal to produce plural parallel correlator signals; a parallel-to-serial unit, responsive to the plural parallel correlator signals, to provide the correlator signal; a metric calculation unit, responsive to the correlator signal, to perform a metric calculation on the correlator signal to produce a calculated metric signal; a packet detection unit, responsive to the calculated metric signal and a threshold, to determine that a packet is detected by comparing with the threshold and to produce a sample index for the packet detection; a coarse symbol timing unit, responsive to the calculated metric signal, to find a peak of the calculated metric signal over a predefined length of time around or from the sample index for packet detection and to output a sample index for the peak as coarse symbol timing information; wherein the sample index for the packet detection and the sample index for the coarse symbol timing information are configured for use in other preamble processing blocks, and in processing a physical layer convergence procedure (PLCP) header and physical layer service data unit (PSDU) block.

Architecture B

Figure 4:
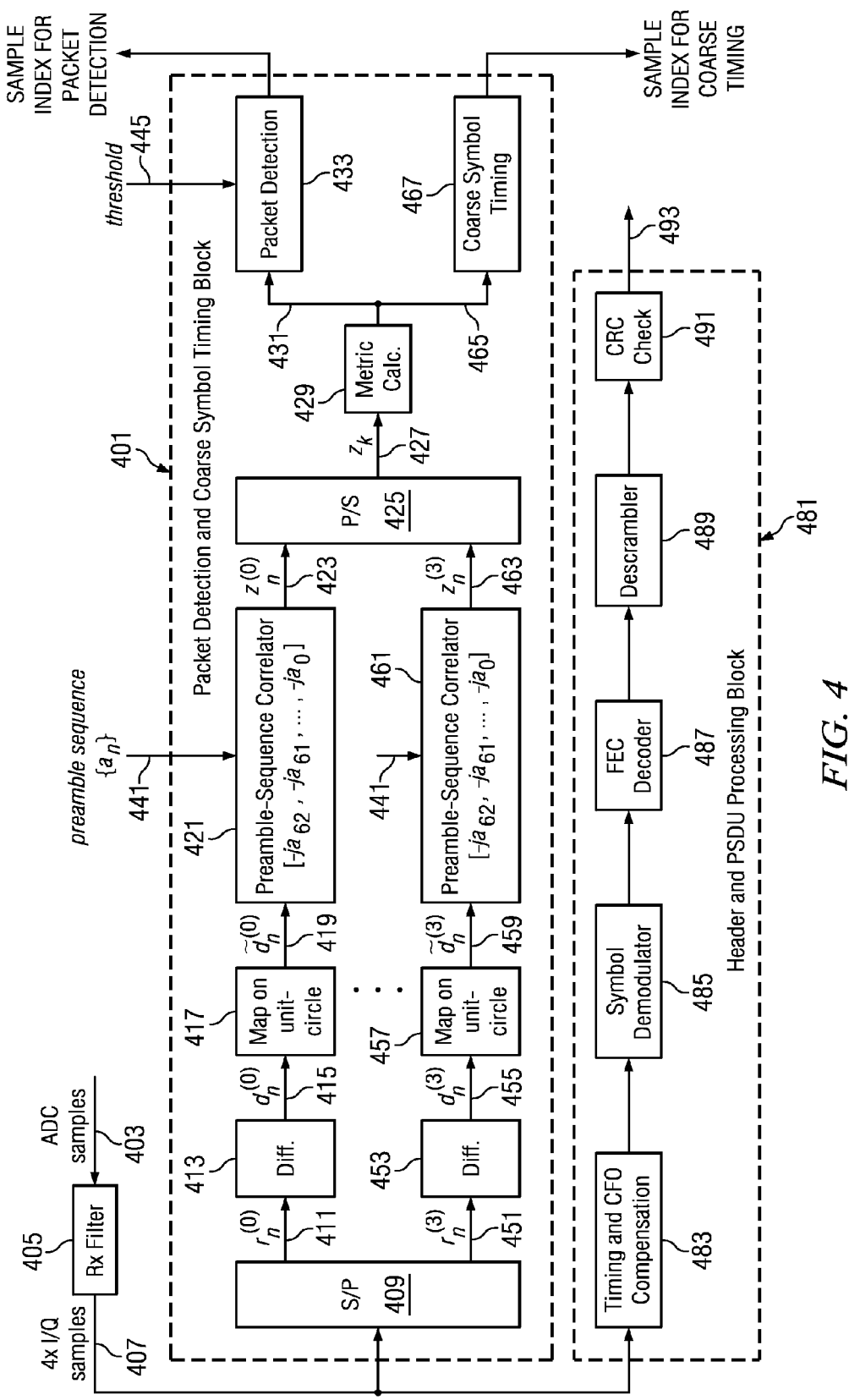
FIG. 4 is a functional block diagram of a second architecture for packet detection and coarse symbol timing (for N=63).

Referring now to FIG. 4, a functional block diagram of a second architecture for packet detection and coarse symbol timing (for N=63) will be discussed and described. Many of the elements in FIG. 4 are similar to those of FIG. 2 and will not be repeated. For example, the same preamble-sequence correlator shown in FIG. 3 is used in this embodiment. A difference from the embodiment shown in FIG. 2 is that there is a 'map on unit-circle' block in each branch of the packet detector.

In overview, in a packet detection and coarse symbol timing recovery system 401 for a preamble signal modulated with rotated differential M-ary PSK modulation, ADC samples 403 are received by a receive filter 405 to provide a filtered receiver signal sample 407. The system 401 then performs serial to parallel 409 on the filtered receiver signal sample 407 to provide a receiver sample 411. Then the differential detector 413, 453 processes the received sample 411, 451 more specifically, taking a complex conjugate of the sample corresponding to the previous symbol and multiplying the conjugated one-symbol earlier sample with the current received sample, to calculate the soft-decision symbol 415, 455. The system 401 takes the symbol 415, 455 into a map on unit-circle block 417, 457 to produce a mapped symbol 419, 459. The mapped symbol 419, 459 is input to the preamble sequence correlator 421, 461, which then outputs the correlator output 423, 463. The multiple sets of differential detector 413, 453, the map on-unit circle 417, 457 and the preamble-sequence correlator 421, 461 are in parallel. The correlator output 423, 463 from each of the parallel branches are input to a parallel to serial block 425 to provide a single correlator output 427. The single correlator output 427 is input to a metric calculation block 429 that calculates and outputs the metric 431 (as previously discussed). Then the system 401 performs a comparison of the metric 431 with the event threshold 445 in the packet detection block 433. Once the threshold is exceeded, the packet is deemed to be acquired. The packet detection block 433 outputs a sample index for packet detection. Once the packet is acquired, the metric 465 is input to a coarse symbol timing block 467. The coarse symbol timing block 467 performs peak detection over a predefined window length around or from the sample index for packet detection, to try to find the peak in the metric within the window. Once the coarse symbol timing is acquired for the metric, the coarse symbol timing block 467 outputs a sample index for the peak as coarse symbol timing information.

The sample index for packet detection and the sample index for coarse symbol timing can be used (directly or after being further refined) in a PLCP header and PSDU processing block 481 to decode the packet, as described in connection with FIG. 2. The header and PSDU processing block 481 can receive the filtered receives samples 407, and can include timing and CFO compensation 483, symbol demodulator 485, FEC decoder 487, descrambler 489, and CRC check 491 to output a PSDU 493 for further processing. The PSDU processing block 481 and components therein are well understood in the art, and hence further discussion thereof will be omitted.

Map on Unit-Circle

There is one additional block in architecture B in comparison to architecture A: the map on unit circle 417, 457. The map on unit circle block 417, 457 is a block between the differential demodulator 413, 453 and the preamble sequence correlator 421, 461.

The amplitude of the received signal over wireless channel can vary, for example, depending on the distance and the gain at the front end. The received signal can be modeled as a complex signal with a real component and an imaginary component, and its magnitude depends on the signal strength of the received signal. The received signal strength is determined by many factors which include the distance from the transmitter and the gain of the front end. Typically in the receiver, there is an automatic gain control (AGC) block that tries to compensate the variation of the received signal level. But this AGC is not always perfect, therefore, the amplitude of the input samples to the packet detection and coarse symbol timing block typically is varying, which affects the performance of the packet detection and coarse symbol timing recovery.

The map on unit-circle block 417, 457 can eliminate the effect described above. By using the map on unit-circle block 417, 457, the preamble sequence correlator 421, 461 looks at the phase information only and does not use the magnitude information.

The map on unit-circle block 417, 457 takes the phase information of the symbol $d_n^{(i)}$ 415, 455. The mapper may be represented mathematically as follows:

$$\tilde{d}_n^{(i)} = \frac{d_n^{(i)}}{|d_n^{(i)}|} \quad (9)$$

In some embodiments, the phase information shown in equation (9) may be calculated by using CORDIC algorithm among others, all of which are known techniques.

In some embodiments, the explicit division operation shown in equation (9) is not necessary. That is, the symbol may be quantized, using a quantization codebook located, for example, either between the differential modulator 413, 453 and the serial to parallel 409 or between the differential modulator 413, 453 and the preamble-sequence correlator 421, 461 and each quantization point in the quantization codebook is on or around a unit-circle. That way the computation complexity in the following blocks can be reduced.

Additionally, in some embodiments, the locations of the differential demodulator 413, 453 and the map on unit-circle block 417, 457 shown in FIG. 4 may be reversed; that is, the map on unit-circle block 417, 457 may be located between the differential modulator 413, 453 and the serial to parallel 409. The differential modulator 413, 453 would then determine and provide a symbol signal to the preamble-sequence correlator 421, 461 in response to the parallel received signal with magnitude information removed.

Accordingly, there can be provided a packet detection and coarse symbol timing circuit or system, further comprising a map on unit circle unit, responsive to the symbol signal from the differential detection unit, to remove magnitude information from the symbol signal but retain the phase information, and provide to the preamble sequence correlator the symbol signal with the magnitude information reduced and the phase information retained as the symbol signal.

Architecture C

Figure 5:
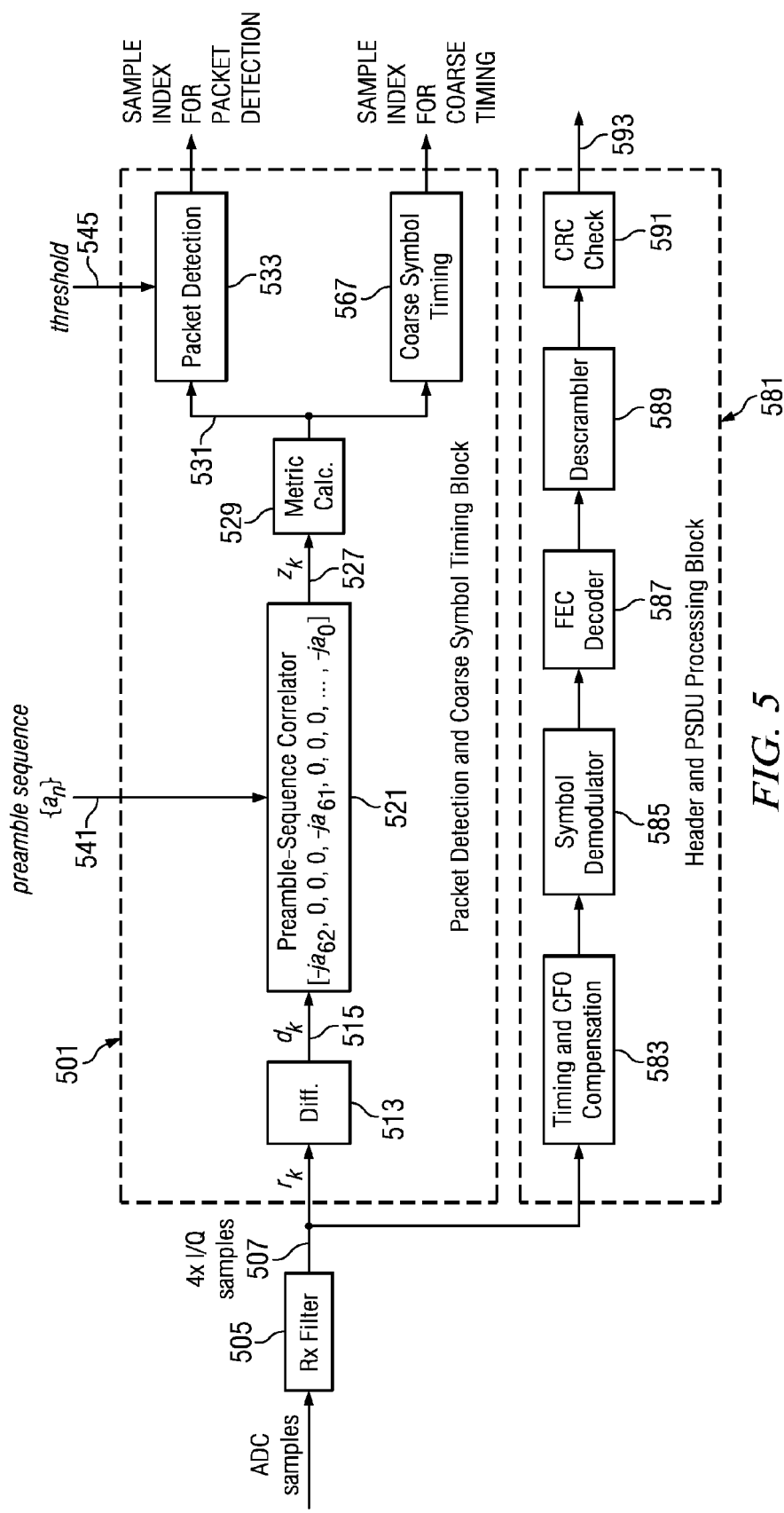
FIG. 5 is a functional block diagram of a third architecture for packet detection and coarse symbol timing (for N=63).
Figure 6:
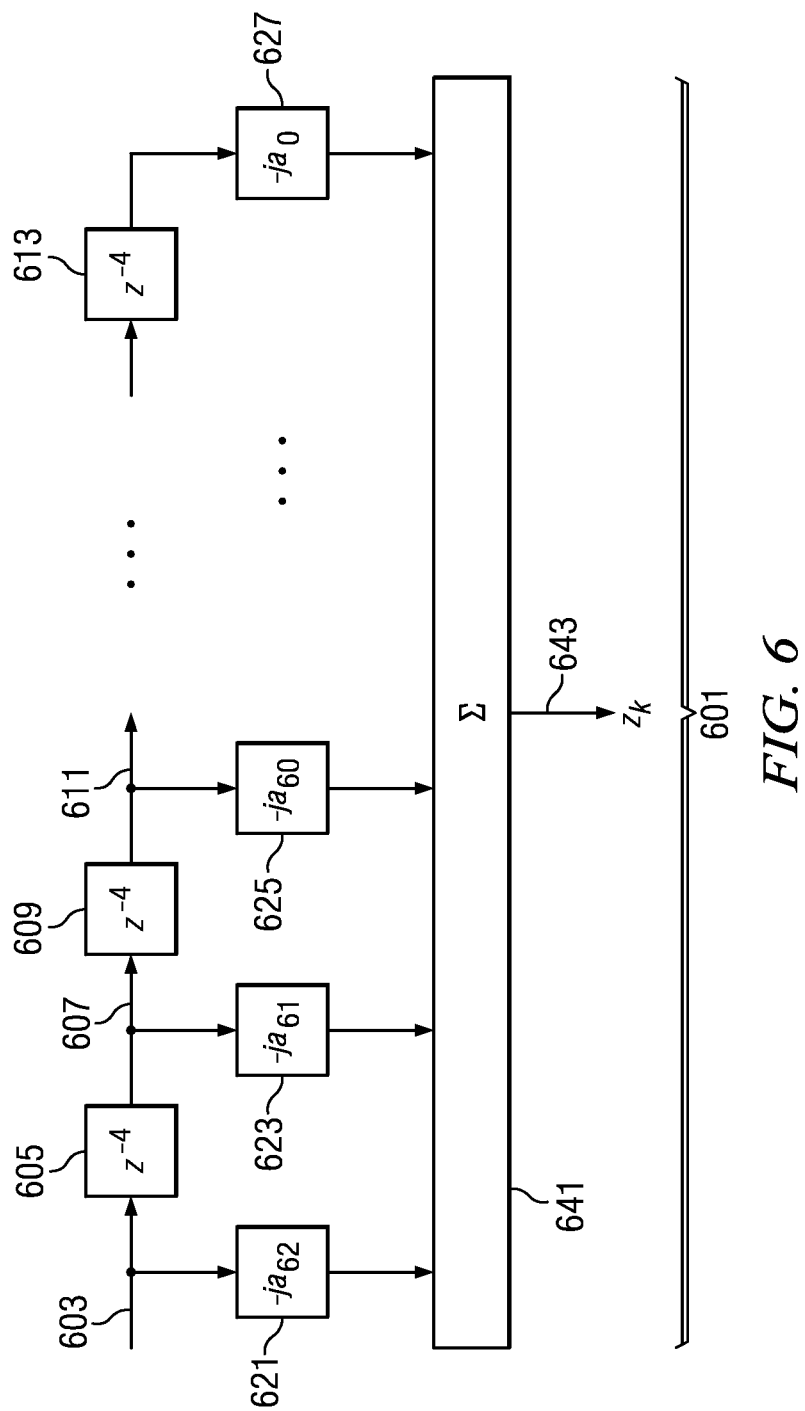
FIG. 6 is a functional block diagram of a preamble-sequence correlator of FIG. 5.

Referring now to FIG. 5, a functional block diagram of a third architecture for packet detection and coarse symbol timing (for N=63) will be discussed and described. FIG. 5 shows another architecture that is functionally equivalent to architecture A. The preamble-sequence correlator is shown in FIG. 6. In comparison to architecture A which is a parallel architecture, here the packet detector now has a single branch. The serial packet detector operates at 4 times oversampling rate in this example ($R_{os,PD}=4$), although other oversampling rates will be appreciated by those of skill in the art.

In overview, in a packet detection and coarse symbol timing recovery system 501 for a preamble signal modulated with rotated differential M-ary PSK modulation, ADC samples are received by a receive filter 505 to provide a receiver sample 507. Then the differential detector 513 processes the received sample 507, more specifically, taking a complex conjugate of the sample corresponding to the previous symbol and multiplying the conjugated one-symbol earlier sample with the current received sample, to calculate the soft-decision symbol. The symbol 515 is input to the preamble sequence correlator 521, which then outputs the correlator output 527. The correlator output 527 is input to a metric calculation block 529 that calculates and outputs the metric 531. Then the packet detection block 533 performs a comparison of the metric 531 with the event threshold 545. Once the threshold is exceeded, the packet is deemed to be acquired. The packet detection block 533 also outputs a sample index for packet detection. Once the packet is detected, the metric 531 is input to a coarse symbol timing block 567. The coarse symbol timing acquisition block 567 performs peak detection for a pre-defined window length to try to find the peak in the metric 531 within the window. The coarse symbol timing block 567 outputs a sample index for coarse symbol timing.

As previously described, the sample index for packet detection and the sample index for coarse symbol timing can be used (directly or after being further refined) in a PLCP header and PSDU processing block 581 which includes well-understood components to decode the packet. The header and PSDU processing block 581 can receive the filtered receives samples 507, and can include timing and CFO compensation 583, symbol demodulator 585, FEC decoder 587, descrambler 589, and CRC check 591 to output a PSDU 593 for further processing.

The functional block diagram for one embodiment of packet detection and coarse symbol timing as illustrated in FIG. 5 will now be discussed in more detail, and the functionality of each block will be described. However, the metric calculation block 529, packet detection block 533, and coarse symbol timing block 567 are omitted from the following description because they are as described above. The preamble-sequence correlator of FIG. 5 is illustrated in FIG. 6. Much of the detail is omitted where it has been described in connection with one of the above architectures.

Soft-Decision Differential Detector

The differential detector 513 calculates symbols:

$$d_k = r_k r^*_{k-4}. \qquad (10)$$

where k is sample index, and $r_{k-4}$ is the sample that is one-symbol earlier than the current sample $r_k$ and $r^*_{k-4}$ is the complex conjugate of $r_{k-4}$. This is an example for an oversample rate of 4; one of skill in the art will understand that the oversample rate can be different from the example illustrated here.

That is, the differential detector 513 processes the received samples, more specifically, taking a complex conjugate of the sample corresponding to the previous symbol and multiplying the conjugated one-symbol earlier sample with the current received sample, to calculate the (soft-decision) symbol. The symbol is output as a signal 515 from the differential detector 513 into the preamble sequence correlator 521.

Preamble-Sequence Correlator

Referring now to FIG. 6, a functional block diagram of a preamble-sequence correlator of FIG. 5 will be discussed and described. The correlator 601 (FIG. 5, 521) can include delay elements 605, 609, 613 (represented by rectangles with the symbol $z^{-4}$), the filter coefficients corresponding to a delay of four samples 621, 623, 625, 627 (represented by rectangles with the symbol $-ja_{xx}$) of the correlator (coming from the preamble sequence), and a summer 641. Each of the filter coefficient 621, 623, 625, . . . , 627, is multiplied by the delayed sample (the current sample 603 and the output of the delay elements 605, 609 . . . 613) that are summed by the summer 641 to provide the correlator output 643 (also referred to as the "correlate"). This example illustrates a four-sample delay, which is different from architecture A and architecture B. One of skill in the art will understand that the oversample rate can be different from the example illustrated here.

The preamble-sequence correlator 601 takes a correlation operation to the symbols 603 with the (known) preamble sequence.

FIG. 6 shows an implementation example for the correlator. When correlation length is N (in symbols), the functional operation of preamble-sequence correlator 601 may be described as follows:

Filter input: $d_k$

Filter impulse response:
$[-ja_{62}, 0, 0, 0, -ja_{61}, 0, 0, 0, -ja_{60}, \ldots, 0, 0, 0, -ja_{62-N+1}]$
where $a_n \in \{1, -1\}$ is the bipolar preamble sequence ('1' for bit 0 and '−1' for bit 1), and N is the correlation length (in symbols). Again, this is an example for an oversample rate of 4; one of skill in the art will understand that the oversample rate can be different from the example illustrated here.

Denote the correlator output as $z_k$. The correlator signal produced by the preamble sequence correlator is given mathematically by:

$$z_k = \sum_{l=0}^{R_{os}N-1} h_l d_{k-l} \qquad (11)$$

where $d_k$ is filter input, $R_{os}$ is the oversampling rate $h_l$ ($l=0, 1, \ldots, R_{os}N-1$) is the filter impulse response, and it is defined as the l-th element of $[-ja_{62}, 0, 0, 0, -ja_{61}, 0, 0, 0, -ja_{60}, \ldots, 0, 0, 0, -ja_{62-N+1}]$, $a_n \in \{1, -1\}$ is a bipolar preamble sequence ('1' for bit 0 and '−1' for bit 1), N is the correlation length in symbol time, and $z_k$ denotes the correlator signal.

Accordingly, there is provided a packet detection and coarse symbol timing system or circuit that includes: a differential detection unit, responsive to a received signal, to determine and provide a symbol signal, wherein the symbol signal is determined responsive to a received signal; a preamble sequence correlator, responsive to the symbol signal, to perform a preamble sequence correlation on the symbol signal to produce a correlator signal; a metric calculation unit, responsive to the correlator signal, to perform a metric calculation on the correlator signal to produce a calculated metric signal; a packet detection unit, responsive to the calculated metric signal and a threshold, to determine that a packet is detected by comparing to the threshold and to produce a sample index for the packet detection; and a coarse symbol timing unit, responsive to the calculated metric signal, to find a peak of the calculated metric signal over a predefined length of time around or from the sample index for packet detection and to output a sample index for the peak as coarse symbol timing information, wherein the sample index for the packet detection and the sample index for the pack as coarse symbol timing information are configured for use in processing a physical layer convergence procedure (PLCP) header and physical layer service data unit (PSDU) block.

Architecture D

Referring now to FIG. 7, a functional block diagram of a fourth architecture for packet detection and coarse symbol timing (when N=63) will be discussed and described. FIG. 7 shows another architecture that is functionally equivalent to architecture B. The same preamble-sequence correlator shown in FIG. 6 is used.

In overview, in a packet detection and coarse symbol timing recovery system 701 for a preamble signal modulated with rotated differential M-ary PSK modulation, ADC samples are received by a receive filter 705 to provide a receiver sample 707. Then the differential detector 713 processes the received sample 707, more specifically, taking a complex conjugate of the sample corresponding to the previous symbol and multiplying the conjugated one-symbol earlier sample with the current received sample, to calculate the soft-decision symbol. The system 701 takes the symbol 715 into a map on unit-circle block 717 to produce a mapped symbol 719. The mapped symbol 719 is input to the preamble sequence correlator 721, which then outputs the correlator output 727. The correlator output 727 is input to a metric calculation block 729 that calculates and outputs the metric 731. Then the packet detection block 733 performs a comparison of the metric 731 with the event threshold 745. Once the threshold is exceeded, the packet is deemed to be acquired. The packet detection block 733 also outputs a sample index for packet detection. Once the packet is detected, the metric 731 is input to a coarse symbol timing block 767. The coarse symbol timing acquisition block 767 performs peak detection over a pre-defined window length around or from the sample index for packet detection, to try to find the peak in the metric 731 within the window. The coarse symbol timing block 767 outputs a sample index for the peak as coarse symbol timing information.

As previously described, the sample index for packet detection and the sample index for coarse symbol timing can be used in a PLCP header and PSDU processing block 781 which includes well-understood components to decode the packet. The header and PSDU processing block 781 can receive the filtered receives samples 707, and can include timing and CFO compensation 783, symbol demodulator 785, FEC decoder 787, descrambler 789, and CRC check 791 to output a PSDU 793 for further processing.

The map on unit-circle block 717 as illustrated in FIG. 7 will now be discussed in more detail. However, the differential detector 715, metric calculation block 729, packet detection block 733, and coarse symbol timing block 767 are omitted from the following description because they are as described above in connection with FIG. 5. The preamble-sequence correlator 721 of FIG. 7 is illustrated in FIG. 6. Much of the detail is omitted because it has been described in connection with one of the above architectures.

Map on Unit-Circle

The map on unit-circle block 417 can eliminate the effect of the received signal strength, as further discussed above, looking at the phase information only and omitting the magnitude information.

In the map on unit-circle block 717 of FIG. 7, the map on unit-circle block 717 takes the phase information of the symbol $d_k$ 715. The mapper may be represented mathematically as follows:

$$\tilde{d}_k = \frac{d_k}{|d_k|} \qquad (11)$$

Figure 8:
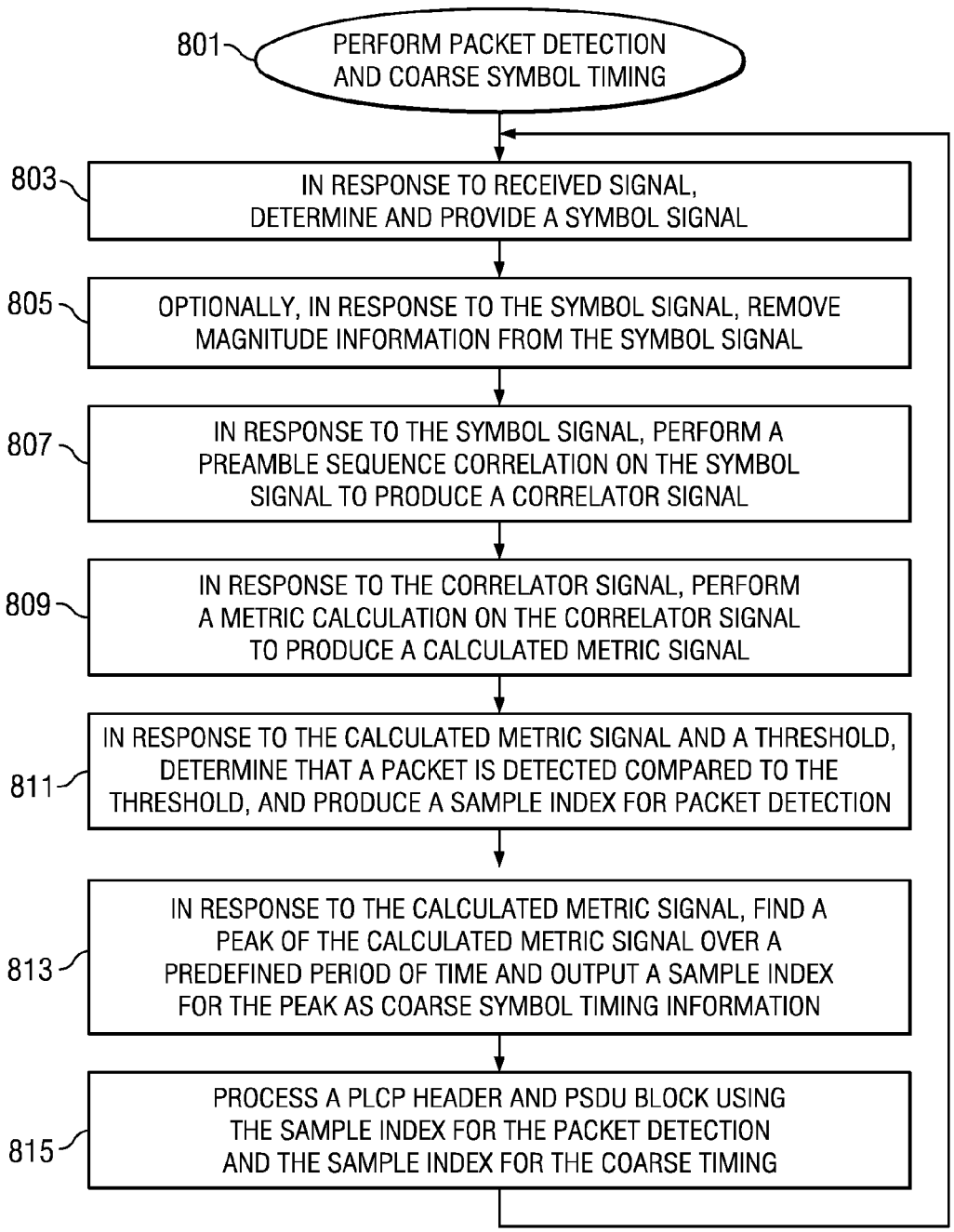
FIG. 8 is a flow chart illustrating a procedure to perform packet detection and coarse symbol timing.

Referring now to FIG. 8, a flow chart illustrating a procedure to perform packet detection and coarse symbol timing will be discussed and described. The procedure can advantageously be implemented on, for example, non-transitory computer readable media, a processor, or at least partly or completely within a circuit or combination of circuits, described in connection with FIG. 2, FIG. 4, FIG. 5 or FIG. 7, or other apparatus appropriately arranged.

In overview, in a procedure 801 to perform packet detection and coarse symbol timing, the procedure includes providing 803 a symbol signal, optionally removing 805 magnitude information from the symbol signal, performing 807 a preamble sequence correlation to produce a correlator signal, performing 809 a metric calculation to produce a calculated metric signal, determining 811 that a packet is detected and producing a sample index for packet detection, finding 813 a peak of the calculated metric signal and outputting a sample index for coarse symbol timing, and then processing 813 a PLCP header and PSDU block. The steps in the process 801 then repeats for the received signal so that successive received incoming packets can be detected. Each of these is described in slightly more detail, keeping in mind that significant detail has been provided above and will not be repeated below.

The procedure 801 includes providing 803 a symbol signal, in response to a received signal, to provide a symbol signal. The received signal is received by a receiver in connection with packet communications that employ a preamble modulated with rotated differential M-ary PSK modulation, packet communications that employ a preamble modulated according to IEEE standard for BAN, or packet communications formatted according to a BAN (body area network) that is based on IEEE standard for BAN. This is discussed in more detail above.

The procedure 801 can optionally include, responsive to the symbol signal from the differential detection unit, removing 805 magnitude information from the symbol signal but retaining the phase information, and providing the symbol signal with the magnitude information removed and the phase information retained as the symbol signal, as further explained above in detail.

The procedure 801 includes performing 807 a preamble sequence correlation, in response to the symbol signal, the preamble sequence correlation being performed on the symbol signal to produce a correlator signal. The preamble sequence correlation has been discussed in much detail above. The procedure 801 includes performing 809 a metric calculation, in response to the correlator signal, to produce a calculated metric signal from the correlator signal. Various examples for producing the calculated metric signal are discussed above The procedure 801 includes determining 811, in response to the calculated metric signal and a threshold, determining that a packet is detected, and producing a sample index for packet detection, all as discussed above. As previously explained, when the calculated metric signal exceeds the threshold, a packet is declared to be detected; when the calculated metric signal does not exceed the threshold, a packet is not declared to be detected.

The procedure 801 includes finding 813, in response to the calculated metric signal, a peak of the calculated metric signal over a predefined period of time, and outputting a sample index for coarse symbol timing, all as discussed above.

The procedure 801 includes processing 815 a PLCP header and PSDU block, using the sample index for the packet detection and the sample index for the coarse symbol timing (directly or after being further refined), since the packet was declared to be acquired and the packet can now be processed.

The procedure 801 can further include quantizing the symbol using a codebook whose codepoints are on and around the unit circle.

According to the procedure 801, the predetermined sequence portion of a PLCP preamble on a packet communications network is used for the packet detection and the coarse symbol timing, the predetermined sequence portion being predetermined at both a transmitter of the received signal and the preamble sequence correlator at a receiver of the received signal.

Accordingly, one embodiment can provide that only an M sequence portion of a PLCP preamble on a packet communications network is used for the packet detection and the coarse symbol timing. In other embodiments, other predetermined sequence portions are used for the packet detection and the coarse symbol timing.

Accordingly, a received signal on the packet communications network is in a format compliant with the IEEE standard for body area networks.

Accordingly, there is provided a method for performing packet detection and coarse symbol timing for packet communications that employ preamble modulated with rotated differential M-ary PSK modulation. According to the method: in a differential detection unit, responsive to a received signal, determining and providing a symbol signal, wherein the symbol signal is determined responsive to the received signal; in a preamble sequence correlator, responsive to the symbol signal, performing a preamble sequence correlation on the symbol signal to produce a correlator signal; in a metric calculation unit, responsive to the correlator signal, performing a metric calculation on the correlator signal to produce a calculated metric signal; in a packet detection unit, responsive to the calculated metric signal and a threshold, determining that a packet is detected compared to the threshold and producing a sample index for the packet detection; and in a coarse symbol timing unit, responsive to the calculated metric signal, finding a peak of the calculated metric signal over a predefined length of time around or from the sample index for packet detection and outputting a sample index for the peak as coarse symbol timing information, wherein the sample index for the packet detection and the sample index for the coarse symbol timing are configured for use in processing a physical layer convergence procedure (PLCP) header and physical layer service data unit (PSDU) block. In another embodiment, only an M sequence portion of a PLCP preamble on a packet communications network is used for the packet detection and the coarse symbol timing.

It should be noted that the term "communication system" may be used interchangeably herein with communication device or communication unit. Each of these terms denotes a device which is typically a wireless mobile device that may be used with a packet communication network, typically using ultra low power and hence short range communications, some of which can also be equipped with motion detectors and/or physiological sensors. Examples of such units include wearable computing devices, wireless patient remote sensors, body sensor network nodes, wireless body area network modem, personal digital assistants, personal assignment pads, and personal computers equipped for wireless operation, a cellular handset or device, or equivalents thereof provided such units are arranged and constructed for operation with a packet communication network.

The designation "IEEE standard for BAN" and "IEEE standard for body area network" are defined herein to mean a network in compliance with the specification in IEEE P802.15.6/D01, Draft Standard for Body Area Network, May 2010, variants and evolutions thereof.

Furthermore, the communication networks of interest include those that transmit information in packets, for example, those known as packet switching networks that transmit data in the form of packets, where messages can be divided into packets before transmission and the packets comprise codewords, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), wireless body area networks (WBAN), body area networks (BAN), body sensor networks (BSN) and others. Protocols supporting communication networks that utilize packets include one or more of various networking protocols, such as IEEE P802.15.6/D01, Draft Standard for Body Area Network, May 2010 TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode, Bluetooth, Bluetooth low energy, IEEE 802.15.4-2003 standard for wireless home area networks (WHANs) such as ZigBee, and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A packet detection and coarse symbol timing recovery system for preamble signal modulated with rotated differential M-ary phase shift keying (PSK) modulation, comprising:
   a serial-to-parallel unit, responsive to a received signal, to branch the received signal into plural parallel received signals each operating at a same symbol rate and one of plural different sampling phases;
   a differential detection unit, responsive to one of the plural parallel received signals, to determine and provide a symbol signal, wherein the symbol signal is determined responsive to one of the plural parallel received signals;
   a preamble sequence correlator, responsive to the symbol signal, to perform a preamble sequence correlation on the symbol signal to produce a correlator signal,
   the differential detection unit and the preamble sequence correlator running in serial, plural differential detection units and plural preamble sequence correlators operating in parallel on different branches of the branched received signal to produce plural parallel correlator signals;
   a map on unit circle unit, responsive to the symbol signal from the differential detection unit, to remove magnitude information from the symbol signal, and provide to the preamble sequence correlator the symbol signal with the magnitude information removed and phase information retained as the symbol signal;
   a parallel-to-serial unit, responsive to the plural parallel correlator signals, to provide the correlator signal;
   a metric calculation unit, responsive to the correlator signal, to perform a metric calculation on the correlator signal to produce a calculated metric signal;
   a packet detection unit, responsive to the calculated metric signal, to determine that a packet is detected and to produce a sample index for the packet detection; and
   a coarse symbol timing unit, to find a peak of the calculated metric signal and to output a sample index for the peak as coarse symbol timing information;
   wherein the sample index for the packet detection and the sample index for the coarse symbol timing information are configured for use in processing a physical layer convergence procedure (PLCP) header and physical layer service data unit (PSDU) block and further use in preamble processing.

2. The packet detection and coarse symbol timing recovery system of claim 1, each of the preamble sequence correlators including delay elements, filter coefficients, and a summer, each of the filter coefficients being multiplied by a delayed sample output of the delay elements that are summed by the summer to provide the parallel correlator signals.

3. A packet detection and coarse symbol timing recovery system for preamble signal modulated with rotated differential M-ary phase shift keying (PSK) modulation, comprising:
- a serial-to-parallel unit, responsive to a received signal, to branch the received signal into plural parallel received signals each operating at a same symbol rate and one of plural different sampling phases;
- a differential detection unit, responsive to one of the plural parallel received signals, to determine and provide a symbol signal, wherein the symbol signal is determined responsive to one of the plural parallel received signals;
- a preamble sequence correlator, responsive to the symbol signal, to perform a preamble sequence correlation on the symbol signal to produce a correlator signal,
- the differential detection unit and the preamble sequence correlator running in serial, plural differential detection units and plural preamble sequence correlators operating in parallel on different branches of the branched received signal to produce plural parallel correlator signals;
- a parallel-to-serial unit, responsive to the plural parallel correlator signals, to provide the correlator signal;
- a metric calculation unit, responsive to the correlator signal, to perform a metric calculation on the correlator signal to produce a calculated metric signal;
- a packet detection unit, responsive to the calculated metric signal, to determine that a packet is detected and to produce a sample index for the packet detection, wherein the sample index for the packet detection and the sample index for the coarse symbol timing information are configured for use in processing a physical layer convergence procedure (PLCP) header and physical layer service data unit (PSDU) block and further use in preamble processing, wherein the symbol is quantized using a quantization codebook, each quantization point being on or around a unit-circle, the quantized symbol being provided to the preamble sequence correlator as input; and
- a coarse symbol timing unit, to find a peak of the calculated metric signal and to output a sample index for the peak as coarse symbol timing information.

4. A packet detection and coarse symbol timing recovery system for preamble signal modulated with rotated differential M-ary phase shift keying (PSK) modulation, comprising:
- a serial-to-parallel unit, responsive to a received signal, to branch the received signal into plural parallel received signals each operating at a same symbol rate and one of plural different sampling phases;
- a differential detection unit, responsive to one of the plural parallel received signals, to determine and provide a symbol signal, wherein the symbol signal is determined responsive to one of the plural parallel received signals;
- a preamble sequence correlator, responsive to the symbol signal, to perform a preamble sequence correlation on the symbol signal to produce a correlator signal,
- the differential detection unit and the preamble sequence correlator running in serial, plural differential detection units and plural preamble sequence correlators operating in parallel on different branches of the branched received signal to produce plural parallel correlator signals;
- a parallel-to-serial unit, responsive to the plural parallel correlator signals, to provide the correlator signal;
- a metric calculation unit, responsive to the correlator signal, to perform a metric calculation on the correlator signal to produce a calculated metric signal;
- a packet detection unit, responsive to the calculated metric signal, to determine that a packet is detected and to produce a sample index for the packet detection, wherein the sample index for the packet detection and the sample index for the coarse symbol timing information are configured for use in processing a physical layer convergence procedure (PLCP) header and physical layer service data unit (PSDU) block and further use in preamble processing wherein the differential detection unit takes a complex conjugate of a sample corresponding to a previous symbol and multiplying a conjugated one-symbol earlier sample with a current received sample, to calculate the symbol; and
- a coarse symbol timing unit, to find a peak of the calculated metric signal and to output a sample index for the peak as coarse symbol timing information.

5. A packet detection and coarse symbol timing recovery system for preamble signal modulated with rotated differential M-ary phase shift keying (PSK) modulation, comprising:
- a serial-to-parallel unit, responsive to a received signal, to branch the received signal into plural parallel received signals each operating at a same symbol rate and one of plural different sampling phases;
- a differential detection unit, responsive to one of the plural parallel received signals, to determine and provide a symbol signal, wherein the symbol signal is determined responsive to one of the plural parallel received signals;
- a preamble sequence correlator, responsive to the symbol signal, to perform a preamble sequence correlation on the symbol signal to produce a correlator signal, the differential detection unit and the preamble sequence correlator running in serial, plural differential detection units and plural preamble sequence correlators operating in parallel on different branches of the branched received signal to produce plural parallel correlator signals, wherein the preamble sequence correlation comprises exchanging inphase and quadrature samples of the preamble sequence in the received signal, and changing of sign to the inphase and quadrature samples using the binary preamble sequence, which are summed to produce the correlator signal, the preamble sequence being binary and bipolar;
- a parallel-to-serial unit, responsive to the plural parallel correlator signals, to provide the correlator signal;
- a metric calculation unit, responsive to the correlator signal, to perform a metric calculation on the correlator signal to produce a calculated metric signal;
- a packet detection unit, responsive to the calculated metric signal, to determine that a packet is detected and to produce a sample index for the packet detection;
- a coarse symbol timing unit, to find a peak of the calculated metric signal and to output a sample index for the peak as coarse symbol timing information.

6. A packet detection and coarse symbol timing recovery system for preamble signal modulated with rotated differential M-ary phase shift keying (PSK) modulation, comprising:
- a serial-to-parallel unit, responsive to a received signal, to branch the received signal into plural parallel received signals each operating at a same symbol rate and one of plural different sampling phases;
- a differential detection unit, responsive to one of the plural parallel received signals, to determine and provide a symbol signal, wherein the symbol signal is determined responsive to one of the plural parallel received signals;

a preamble sequence correlator, responsive to the symbol signal, to perform a preamble sequence correlation on the symbol signal to produce a correlator signal, the differential detection unit and the preamble sequence correlator running in serial, plural differential detection units and plural preamble sequence correlators operating in parallel on different branches of the branched received signal to produce plural parallel correlator signals;

a parallel-to-serial unit, responsive to the plural parallel correlator signals, to provide the correlator signal;

a metric calculation unit, responsive to the correlator signal, to perform a metric calculation on the correlator signal to produce a calculated metric signal;

a packet detection unit, responsive to the calculated metric signal, to determine that a packet is detected and to produce a sample index for the packet detection;

a coarse symbol timing unit, to find a peak of the calculated metric signal and to output a sample index for the peak as coarse symbol timing information, wherein the coarse symbol timing unit, responsive to the calculated metric signal and after packet detection is declared, finds the peak of the calculated metric signal over a predefined length of time around or from the sample index for packet detection and outputs the sample index for the peak as coarse symbol timing information.

7. A packet detection and coarse symbol timing recovery system for preamble signal modulated with rotated differential M-ary phase shift keying (PSK) modulation, comprising:

a differential detection unit, responsive to a received signal, to determine and provide a symbol signal, wherein the symbol signal is determined responsive to a received signal;

a map on unit circle unit, responsive to the symbol signal from the differential detection unit, to remove magnitude information from the symbol signal, and provide to the preamble sequence correlator the symbol signal with the magnitude information removed and the phase information retained as the symbol signal;

a preamble sequence correlator, responsive to the symbol signal, to perform a preamble sequence correlation on the symbol signal to produce a correlator signal;

a metric calculation unit, responsive to the correlator signal, to perform a metric calculation on the correlator signal to produce a calculated metric signal;

a packet detection unit, responsive to the calculated metric signal, to determine that a packet is detected and to produce a sample index for the packet detection; and a coarse symbol timing unit, to find a peak of the calculated metric signal and to output a sample index for the peak as coarse symbol timing information, wherein the sample index for the packet detection and the sample index for the coarse symbol timing information are configured for use in processing a physical layer convergence procedure (PLCP) header and physical layer service data unit (PSDU) block and further use in preamble processing.

8. The packet detection and coarse symbol timing recovery system of claim 7, the preamble sequence correlator including delay elements, filter coefficients, and a summer, each of the filter coefficients being multiplied by a delayed sample output from the delay elements that are summed by the summer to provide the correlator signal.

9. A packet detection and coarse symbol timing recovery system for preamble signal modulated with rotated differential M-ary phase shift keying (PSK) modulation, comprising:

a differential detection unit, responsive to a received signal, to determine and provide a symbol signal, wherein the symbol signal is determined responsive to a received signal;

a preamble sequence correlator, responsive to the symbol signal, to perform a preamble sequence correlation on the symbol signal to produce a correlator signal;

a metric calculation unit, responsive to the correlator signal, to perform a metric calculation on the correlator signal to produce a calculated metric signal;

a packet detection unit, responsive to the calculated metric signal, to determine that a packet is detected and to produce a sample index for the packet detection; and a coarse symbol timing unit, to find a peak of the calculated metric signal and to output a sample index for the peak as coarse symbol timing information, wherein the sample index for the packet detection and the sample index for the coarse symbol timing information are configured for use in processing a physical layer convergence procedure (PLCP) header and physical layer service data unit (PSDU) block and further use in preamble processing, wherein the symbol is quantized using a quantization codebook, each quantization point being on or around a unit-circle, the quantized symbol being provided to the preamble sequence correlator as input.

10. A packet detection and coarse symbol timing recovery system for preamble signal modulated with rotated differential M-ary phase shift keying (PSK) modulation, comprising:

a differential detection unit, responsive to a received signal, to determine and provide a symbol signal, wherein the symbol signal is determined responsive to a received signal, wherein the differential detection unit takes a complex conjugate of a sample corresponding to a previous symbol and multiplying a conjugated one-symbol earlier sample with a current received sample, to calculate the symbol;

a preamble sequence correlator, responsive to the symbol signal, to perform a preamble sequence correlation on the symbol signal to produce a correlator signal;

a metric calculation unit, responsive to the correlator signal, to perform a metric calculation on the correlator signal to produce a calculated metric signal;

a packet detection unit, responsive to the calculated metric signal, to determine that a packet is detected and to produce a sample index for the packet detection; and a coarse symbol timing unit, to find a peak of the calculated metric signal and to output a sample index for the peak as coarse symbol timing information, wherein the sample index for the packet detection and the sample index for the coarse symbol timing information are configured for use in processing a physical layer convergence procedure (PLCP) header and physical layer service data unit (PSDU) block and further use in preamble processing.

11. A packet detection and coarse symbol timing recovery system for preamble signal modulated with rotated differential M-ary phase shift keying (PSK) modulation, comprising:

a differential detection unit, responsive to a received signal, to determine and provide a symbol signal, wherein the symbol signal is determined responsive to a received signal;

a preamble sequence correlator, responsive to the symbol signal, to perform a preamble sequence correlation on the symbol signal to produce a correlator signal, wherein the preamble sequence correlation comprises exchanging inphase and quadrature samples of the preamble sequence in the received signal, and changing of sign to the inphase and quadrature samples using the binary preamble sequence, which are summed to produce the correlator signal, the preamble sequence being binary and bipolar;

a metric calculation unit, responsive to the correlator signal, to perform a metric calculation on the correlator signal to produce a calculated metric signal;

a packet detection unit, responsive to the calculated metric signal, to determine that a packet is detected and to produce a sample index for the packet detection; and a coarse symbol timing unit, to find a peak of the calculated metric signal and to output a sample index for the peak as coarse symbol timing information, wherein the sample index for the packet detection and the sample index for the coarse symbol timing information are configured for use in processing a physical layer convergence procedure (PLCP) header and physical layer service data unit (PSDU) block and further use in preamble processing.

12. A packet detection and coarse symbol timing recovery system for preamble signal modulated with rotated differential M-ary phase shift keying (PSK) modulation, comprising:

a differential detection unit, responsive to a received signal, to determine and provide a symbol signal, wherein the symbol signal is determined responsive to a received signal;

a preamble sequence correlator, responsive to the symbol signal, to perform a preamble sequence correlation on the symbol signal to produce a correlator signal;

a metric calculation unit, responsive to the correlator signal, to perform a metric calculation on the correlator signal to produce a calculated metric signal;

a packet detection unit, responsive to the calculated metric signal, to determine that a packet is detected and to produce a sample index for the packet detection; and a coarse symbol timing unit, to find a peak of the calculated metric signal and to output a sample index for the peak as coarse symbol timing information, wherein the sample index for the packet detection and the sample index for the coarse symbol timing information are configured for use in processing a physical layer convergence procedure (PLCP) header and physical layer service data unit (PSDU) block and further use in preamble processing, wherein the coarse symbol timing unit, responsive to the calculated metric signal and after packet detection is declared, finds the peak of the calculated metric signal over a predefined length of time around or from the sample index for packet detection and outputs the sample index for the peak as coarse symbol timing information.

13. A method for performing packet detection and coarse symbol timing for packet communications that employ preamble modulated with rotated differential M-ary phase shift keying (PSK) modulation, comprising:

in a differential detection unit, responsive to a received signal, determining and providing a symbol signal, wherein the symbol signal is determined responsive to the received signal;

in a map on unit circle unit, responsive to the symbol signal from the differential detection unit, to remove magnitude information from the symbol signal, and provide to the preamble sequence correlator the symbol signal with the magnitude information removed as the symbol signal;

in a preamble sequence correlator, responsive to the symbol signal, performing a preamble sequence correlation on the symbol signal to produce a correlator signal;

in a metric calculation unit, responsive to the correlator signal, performing a metric calculation on the correlator signal to produce a calculated metric signal;

in a packet detection unit, responsive to the calculated metric signal, determining that a packet is detected and producing a sample index for the packet detection; and in a coarse symbol timing unit, finding a peak of the calculated metric signal outputting a sample index for the peak as coarse symbol timing information, wherein the sample index for the packet detection and the sample index for the coarse symbol timing information are configured for use in processing a physical layer convergence procedure (PLCP) header and physical layer service data unit (PSDU) block.

14. The method of claim 13, further comprising, quantizing the symbol using a codebook whose codepoints are on and around the unit circle.

15. The method of claim 13, wherein received signal on the packet communications network is in a format compliant with the IEEE standard for body area networks.

16. A method for performing packet detection and coarse symbol timing for packet communications that employ preamble modulated with rotated differential M-ary phase shift keying (PSK) modulation, comprising:

in a differential detection unit, responsive to a received signal, determining and providing a symbol signal, wherein the symbol signal is determined responsive to the received signal;

in a preamble sequence correlator, responsive to the symbol signal, performing a preamble sequence correlation on the symbol signal to produce a correlator signal;

in a metric calculation unit, responsive to the correlator signal, performing a metric calculation on the correlator signal to produce a calculated metric signal;

in a packet detection unit, responsive to the calculated metric signal, determining that a packet is detected and producing a sample index for the packet detection; and in a coarse symbol timing unit, finding a peak of the calculated metric signal outputting a sample index for the peak as coarse symbol timing information, wherein the sample index for the packet detection and the sample index for the coarse symbol timing information are configured for use in processing a physical layer convergence procedure (PLCP) header and physical layer service data unit (PSDU) block, wherein a predetermined sequence portion of a PLCP preamble on a packet communications network is used for the packet detection and the coarse symbol timing, the predetermined sequence portion being predetermined at both a transmitter of the received signal and the preamble sequence correlator at a receiver of the received signal.

17. A method for performing packet detection and coarse symbol timing for packet communications that employ preamble modulated with rotated differential M-ary phase shift keying (PSK) modulation, comprising:

in a differential detection unit, responsive to a received signal, determining and providing a symbol signal, wherein the symbol signal is determined responsive to the received signal;

in a preamble sequence correlator, responsive to the symbol signal, performing a preamble sequence correlation on the symbol signal to produce a correlator signal;

in a metric calculation unit, responsive to the correlator signal, performing a metric calculation on the correlator signal to produce a calculated metric signal;

in a packet detection unit, responsive to the calculated metric signal, determining that a packet is detected and producing a sample index for the packet detection; and in a coarse symbol timing unit, finding a peak of the calculated metric signal outputting a sample index for the peak as coarse symbol timing information, wherein the sample index for the packet detection and the sample index for the coarse symbol timing information are configured for use in processing a physical layer convergence procedure (PLCP) header and physical layer service data unit (PSDU) block, wherein the coarse symbol timing unit, responsive to the calculated metric signal and after packet detection is declared, finds the peak of the calculated metric signal over a predefined length of time around or from the sample index for packet detection and outputs the sample index for the peak as coarse symbol timing information.

18. In a packet detection and coarse symbol timing recovery system for preamble signal modulated with rotated differential M-ary phase shift key (PSK) modulation for packet communications compliant with the IEEE standard for body area networks, a preamble sequence correlator, responsive to a symbol signal, that performs a preamble sequence correlation on a symbol signal to produce a correlator signal, the preamble sequence correlator including delay elements, filter coefficients, and a summer, each of the filter coefficients being multiplied by a delayed sample output of the delay elements that are summed by the summer to provide the correlator signal for further use in preamble processing, wherein the preamble sequence correlation multiplication of the filter coefficients by the delayed sample output is an exchange of inphase and quadrature samples of a preamble sequence in a received signal, and changing of sign to the inphase and quadrature samples using the binary preamble sequence, which are summed to produce the correlator signal, the preamble sequence being binary and bipolar.

19. The packet detection and coarse symbol timing recover system of claim 18, the filter coefficient having a form of $-j*a\_k$ and $a\_k$ is binary.

* * * * *